United States Patent [19]
Sänze et al.

[11] Patent Number: 5,626,888
[45] Date of Patent: May 6, 1997

[54] WIDE SLOT DIE

[75] Inventors: Jöhannes Sänze, Bergen; Jürgan Breil, Grabanstätt, both of Germany; Paul Lindner, Henndorf, Austria; Ulrich Rühlemann, Traunstein, Germany

[73] Assignee: Brückner Maschinenbau GmbH, Siegsdorf, Germany

[21] Appl. No.: 373,210

[22] PCT Filed: May 19, 1994

[86] PCT No.: PCT/EP94/01630

§ 371 Date: Mar. 3, 1995

§ 102(e) Date: Mar. 3, 1995

[87] PCT Pub. No.: WO94/27802

PCT Pub. Date: Dec. 8, 1994

[30] Foreign Application Priority Data

May 20, 1993 [DE] Germany ............... 43 16 913.9

[51] Int. Cl.$^6$ .................................. B29C 47/16
[52] U.S. Cl. ................ 425/141; 264/40.5; 264/177.16; 425/465; 425/466
[58] Field of Search .................. 425/141, 466, 425/461, 465; 264/40.1, 40.5, 177.16

[56] References Cited

U.S. PATENT DOCUMENTS

| | | |
|---|---|---|
| 3,819,775 | 6/1974 | Mules ........................... 425/141 |
| 3,940,221 | 2/1976 | Nissel . |
| 4,990,078 | 2/1991 | Tomita . |
| 4,990,079 | 2/1991 | Lorenz ........................... 425/141 |
| 5,020,984 | 6/1991 | Cloeren et al. ................ 425/141 |
| 5,208,047 | 5/1993 | Cloeren et al. ................ 425/141 |

FOREIGN PATENT DOCUMENTS

| | | |
|---|---|---|
| 0257233 | 3/1988 | European Pat. Off. . |
| 0367022 | 5/1990 | European Pat. Off. . |
| 0383418 | 8/1990 | European Pat. Off. . |
| 3427912 | 3/1986 | Germany . |
| 8813801.1 | 2/1989 | Germany . |
| 3731961 | 4/1989 | Germany . |
| 3834720 | 4/1990 | Germany . |
| WO86/06678 | 11/1986 | WIPO . |

Primary Examiner—Jay H. Woo
Assistant Examiner—Joseph Leyson
Attorney, Agent, or Firm—Nixon & Vanderhye

[57] ABSTRACT

An improved flat-sheet die, compared with the prior art, for an extrusion system for producing flat sheets has an extremely close succession of actuators (13), by way of which at least one die lip (3,5) is adjustable with a narrow-band bending line in order to define the outlet gap (1).

16 Claims, 6 Drawing Sheets

WIDE SLOT DIE

BACKGROUND OF THE INVENTION

The invention is related to a flat-sheet die for the extrusion of flat sheets, having an upper and a lower die lip, which define the outlet gap above and below.

Flat-sheet dies of this kind are employed in plastic sheet production. At least one of the two die lips is embodied as flexible in order to be able to subject the outlet gap to fine adjustment and regulation in accordance with the measurement data obtained. The adjustable lip as a rule is formed by tapering the material, by way of which, via adjustable-length actuators, a corresponding bending load is exerted upon the at least one adjustable sealing lip in order to thereby bring about the adjustment.

A multitude of publications related to flat-sheet dies have already become known, in which the outlet gap can be enlarged or made smaller for example by means of actuators, which can be heated and thereby changed in length. The tool lip which regulates the gap can be provided in other embodiments as well, for instance by means of a field translator, which is based upon the piezoresistive effect.

For example, EP 0 367 022 A2 has made known an extrusion slot die, which includes a multitude of passive actuators, which influence a flexible band; furthermore a number of laminas, which are movably disposed between the band and the flexible lip, are provided for the introduction of the actuating force from the flexible band onto the lip. As a result, the narrowest-band regulation of the outlet gap possible should be enabled, without increasing the number or the spacing of the active actuators, which could not be done anyway for lack of sufficient installation space.

DE 37 31 961 A1 has made known a device for adjusting the gap of a die by means of a thermobolt, which device furthermore includes an air cooling for the more rapid cooling of the thermobolt and hence for the contraction of the actuator.

To that end, axial cooling conduits are provided in the thermobolt, by way of which, via a connectable compressed air hose, a corresponding quantity of cooling air can be adjusted and hence the cooling capacity can be varied. The cooling air is generally compressed air. Here as well the thermobolt itself is embodied once again as a standard compression-tension element.

Additional actuators for the outlet gap, having cooling devices are also known from, among others, EP 0 383 418, DE 36 28 974 C1, EP 0 257 233 B1, EP 0 256 490 B1, and EP 0 229 680 B1. These publications likewise include cooling conduits, through which as a role air can flow through in a controlled manner as a coolant. In EP 0 229 680 B1, it is also described that a fluid, e.g. water, can circulate as the cooling medium.

The flat-sheet dies according to the prior art, though, have disadvantages, which in the production of plastic sheets are relevant to the winding process.

Thus, a general problem for systems of this kind lies in the fact that at the winding station, as the winding thickness of the plastic sheet increases, thick or thin places result from existing thickness variations of the plastic sheet and do not allow rotally constant winding without any thickening or protruberance over the entire width of the plastic sheet.

Later generations of flat-sheet dies have indeed already made possible certain improvements with regard to the desired sheet quality (tighter thickness tolerances). Nevertheless, the results produced before today are no longer satisfactory.

The main problem lies in the range of influence of an actuator, which is too broad for an optimal sheet quality; this is due on the one hand to the wide spacing of the active actuators of over 25 mm, for geometrical reasons of the apparatus, and on the other hand to a massive embodiment of the flexible lip and of the bending line resulting from it. Particularly in sheets (such as BOPP), i.e., Biaxially Orientated Polypropylene which are stretched widthwise, the range of influence with reference to the final film lies in an actuator spacing of from 28 mm to over 230 mm; by means of the bending line of the flexible lip, at least two adjacent zones on each side are influenced. Consequently, small thickness tolerance variations with a width of 100 mm, for example, which can accumulate upon winding until they form so-called "piston tings", can no longer be sufficiently corrected.

A further problem up until now lay in the fact that the adjusting speed of the actuators is too slow, with the result that significant sheet lengths are extruded and wound until a corresponding readjustment can be carded out only after there is an ascertained or measured deviation of the sheet thickness from a desired measure.

Finally in flat-sheet dies according to the prior art, it has turned out that the adjusting unit should be as insensitive as possible to the environmental influences and should have as great a reliability as possible.

SUMMARY OF THE INVENTION

The object of the current invention, therefore, particularly based upon the prior art mentioned at the beginning, is to achieve an improved flat-sheet die having a distinctly increased number of active actuating elements, with which tighter thickness tolerances of the sheet to be manufactured can be produced and therewith an improvement of the sheet quality. The flat-sheet die should also be as insensitive as possible to environmental influences to increase the functional stability.

In a particularly advantageous improvement of the invention, a sufficiently high adjusting speed of the actuators should nevertheless be assured, if the desired thickness profile is to be achieved.

The object is attained according to the invention in accordance with the characteristics indicated in the claim 1 or 18. Advantageous embodiments of the invention are indicated in the dependent claims.

Quite important improvements are achieved by means of the present invention. Quite surprisingly, it has turned out that despite the multitude of movably disposed laminas related to those in EP 0 367 022 A2 which defines the generic type involved here, however, the desired narrow-bandedness of the bending line is still unattainable. This is because, as a result of the use of the described flexible band as a transmission member from the actuators onto the plurality of the flexible laminas, a certain "fuzzy transmission function" sets in (because no active actuators with narrow spacing are used), with the result that finally, the narrow-bandedness of the adjustment cannot be improved at all, or at least not decisively.

A clear increase of the narrow-bandedness, i.e. a very much higher adjustment precision and regulation possibility with regard to the sheet width, though,—and this is likewise quite surprising in extent—leads to quality improvements not previously considered possible with regard to sheet tolerance. In the end, this expresses itself in a distinctly improved winding outcome, since the thick places on the sheet roll, which are otherwise found in the prior art, do not occur at all, or at least not to this extent.

Finally, it must also be indicated that in principle, one can technically realize the accommodation of a multitude of actuators on the device that smaller dimensions in the region in question. This is because the actuator mounting in particular, with the adjusting elements which are required for that purpose and which make possible a basic adjustment, as a rule demands a large enough installation space that "miniaturization" of the actuators and the attainment of such narrow-banded adjustment was previously inconceivable.

In an advantageous embodiment of the invention, furthermore, given the number of adjusting bolts, despite the marked increase in this number, forced cooling is provided, by means of which a high or fast adjusting speed of the adjusting bolt can be achieved.

The flat-sheet die according to the invention is thus distinguished in that, among other characteristics, in order to increase the number of actuators 13 that are adjustable in terms of the total length of the die lips 3, 5, one common preadjusting device 37 each is associated with at least two actuators 13 situated next to each other; and/or two adjacent actuators 13, which succeed one another in the longitudinal direction of the outlet gap 1, on their end situated remote from the adjustable die lips 3, 5, are disposed, or end, with a lateral offset to the longitudinal direction of the outlet gap 1, and consequently the associated preadjusting devices 37 of two adjacent actuators 13 are situated with the corresponding lateral offset from one another, and/or both die lips 3, 5 are provided with adjustable-length actuators 13 in such a way that the actuators 13 associated with the one die lip 3 are disposed offset from the actuators 13 associated with the other die lips 5; and that at least one preadjusting device 37 is associated with the actuators 13 that act upon one of the two die lips 3, 5.

A coarse-adjustment or preadjusting device is associated with the adjustable actuators or with at least one of the two lips (which the adjustable actuators, if need be, also do not directly engage).

The flat-sheet die according to the invention has quite exceptional advantages when employed in stretching devices in plastic sheet production. The advantages, though, are still surprising, even for the production of a so-called cast film.

Further advantages, particulars, and characteristics of the invention will become apparent below from the exemplary embodiment in conjunction with the drawings.

BRIEF DESCRIPTION OF THE DRAWINGS FIGURES

FIG. 1: a schematic cross sectional representation perpendicular to the longitudinal direction of the flat-sheet die;

FIG. 2: a side view of three adjusting members, which belong to a group;

FIG. 3: a schematic front end, top view of the flat-sheet die, with the cooling air circulation device left out;

FIG. 4: a representation of an axial longitudinal section through a modified manual preadjusting device for adjusting the die gap;

FIG. 5: a schematic representation in a cross sectional view of an exemplary embodiment modified from that of FIG. 1;

FIG. 6: a further modification of FIG. 3;

FIG. 7: a further exemplary embodiment in a schematic cross sectional representation perpendicular to the longitudinal direction of the flat-sheet die; and FIG. 8: an abridged bottom view of the flat-sheet die with regard to further exemplary embodiment.

FIG. 9: an abridged schematic top view of a motorized or automatically actuatable preadjusting device for adjusting the die gap;

FIG. 10: a cross sectional representation along the line X—X in FIG. 9.

DESCRIPTION OF A PREFERRED EMBODIMENT

Figure 1:
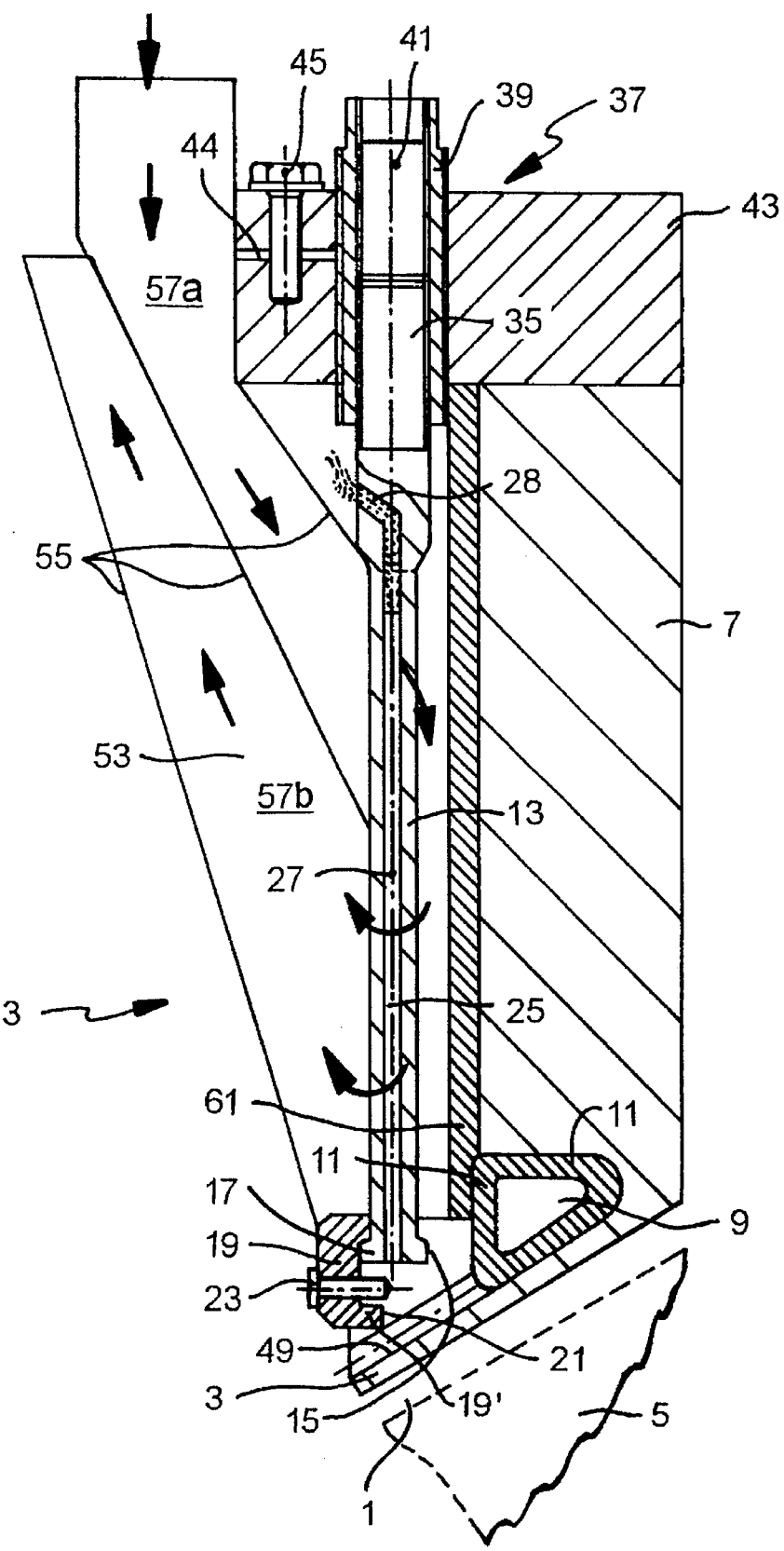
Figure 2:
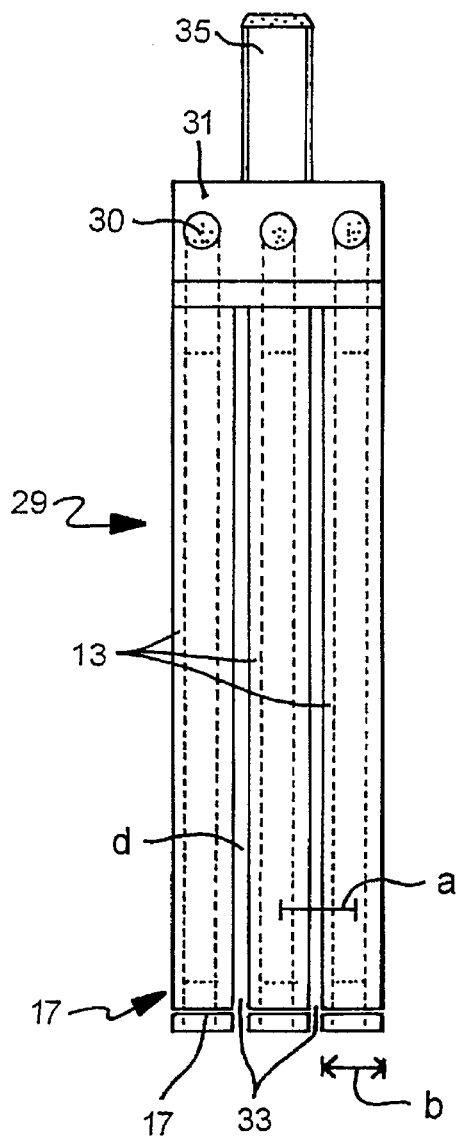

FIGS. 1 and 2 show a first exemplary embodiment of the flat-sheet die, having an upper and lower die lip 3, 5, which define an outlet gap 1. In FIG. 1, the outlet gap 1 extends perpendicular to the plane of the drawing.

The lower die lip 5 is only depicted schematically.

In the upper die lip 3, the rear of actual die body 7, which is embodied with an equally thick material cross section, changes at its lower end into the upper die lip 3, which can be adjusted by exerting compression or tension. To that end, a recess 9, which extends parallel to the outlet gap 1, is let into the transition region from the die body 7 to the die lip 3 as a weakening of the material, in which a hoselike seal 11 is inserted.

The upper die lip 3 has a recess 15 facing the actuators 13, which are explained further below, which recess is dovetail-shaped in cross section, and into which the anchoring head 17 of the actuator 13 is inserted.

The anchoring head 17 is secured on its outer end via retainers 19, which are associated with the individual actuators 13 and in width, are suited to the width or the spacing of two adjacent individual actuators 13, which retainers 19 are provided with a protrusion that fits over the outward—pointing part of the dovetail-shaped widening of the anchoring head 17. Moreover, the retainers, on their end 19 pointing toward the die lip 3, have a further retaining part, which engages in a slitlike indentation 21, and are individually attached to the upper die lip 3 via screws 23.

In the exemplary embodiment shown, the active, i.e. suitably triggerable actuating bolts have a rectangular cross section, having a width b of for example 8.5 mm and a depth or thickness of 12 mm and are provided with a bore 25, which is disposed on the inside and has an appropriate diameter, in which a heating cartridge 27 is inserted in the longitudinal direction of the actuator 13. The various connecting wires 28 of the heating cartridge are extended out of the respective adjusting member through an opening 30 situated on the back side.

Figure 3:
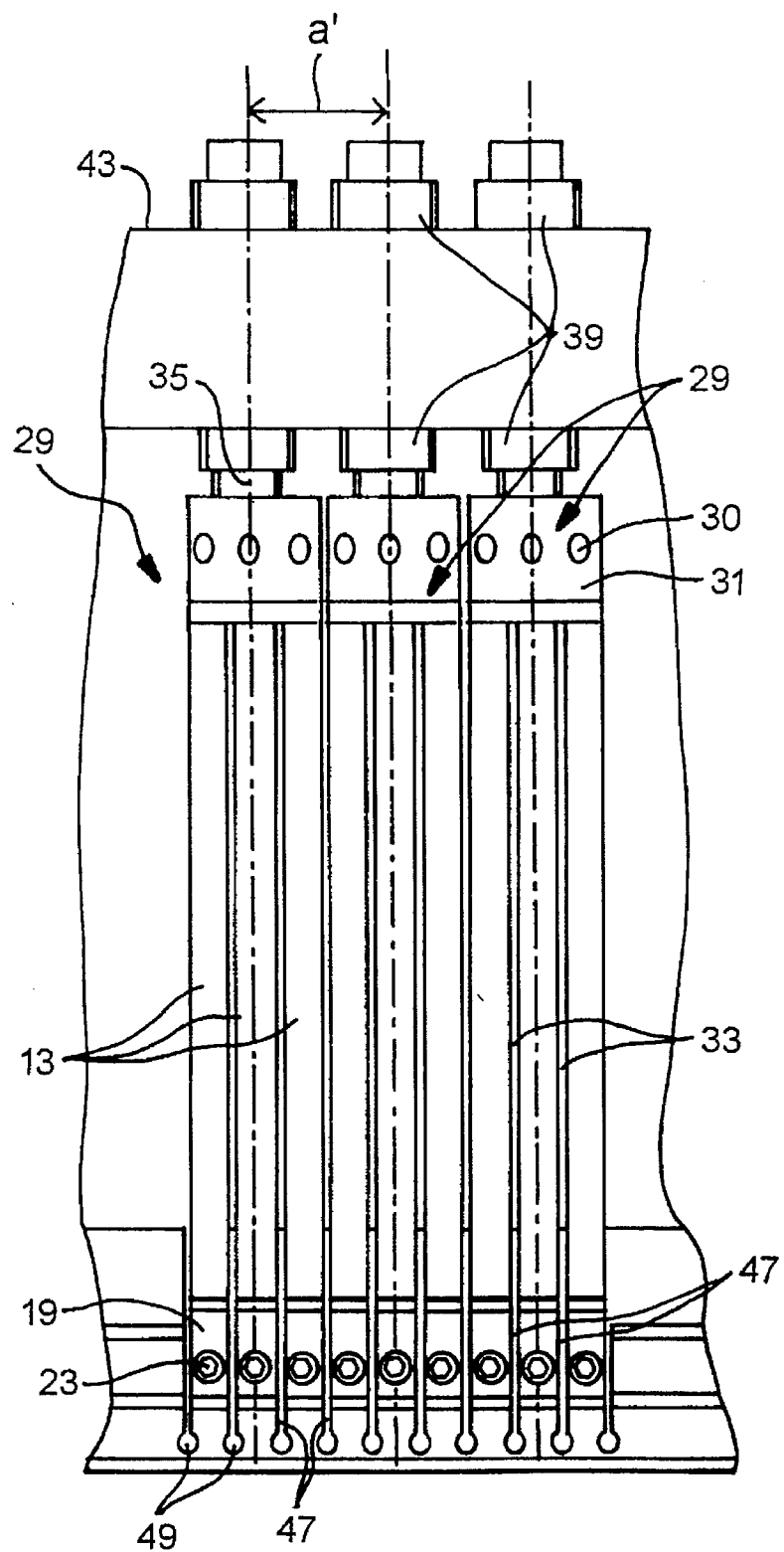

For space reasons and to shorten the adjusting time with regard to the mechanical preadjustment of the die gap 1 as well as to achieve a narrow actuator spacing, in the exemplary embodiment shown, each three actuators are combined into a group or packet 29 (FIGS. 2 and 3). In other words, the actuators 13 combined into a group 29 are seated on a common base 31. In the exemplary embodiment shown, each group 29 of actuators 13 is manufactured of one piece and the individual actuators are cut out of a block of material by making longitudinal slits 33 in it.

In the opposite direction from the actuators 13, a threaded pin 35, which is provided with an external threading protrudes rearward from the base 31 and which via a differential helical gear 37, is connected as a manually actuatable adjusting device to the die body 7 via an anchoring plate.

The differential helical gear 37 is comprised of a differential nut 39, which is provided with internal and external threads; the internal and external threads on the differential nut 39 have different thread pitches so that by a turning of the differential nut 39 in the threaded body 7, even the axial position of a group 29 of actuators 13 is adjusted in the end with a high adjusting precision.

By screwing a threaded pin 41 which serves to accomplish the locking backward into the differential nut 39, after the preadjustment of the die gap has been completed, a locking can be carried out in order to fix the threaded pin 35, which pin belongs to the base 31, in the differential nut 39 so as to prevent relative rotation.

Furthermore, the base plate or cross bar 43 shown in the drawings is attached by screws to the die body 7, perpendicular to the axial direction of the differential nut 39, slit on at least one side; a locking screw 45 passes through this plate slit 44 and by tightening produces a fixing and clamping, which reliably hinders and prevents a thread play and an undesired movement of the differential nut 39 and hence of the differential helical gear 37. The above described assembly of these actuators simultaneously also constitutes the interface for the purposes of the automated die gap preadjustment.

Deviating from the above described mechanical preadjusting device shown in FIG. 1 for the basic preadjustment of the die gap, a slit recess of the base plate or cross bar 43 can be provided in the axial longitudinal direction, if mounted suitably in the three dimensions; the screw, fitting over the gap in a suitable crosswise alignment to it, would then brace the two parts of the base plate or cross bar 43, which neighbor the gap.

Figure 4:
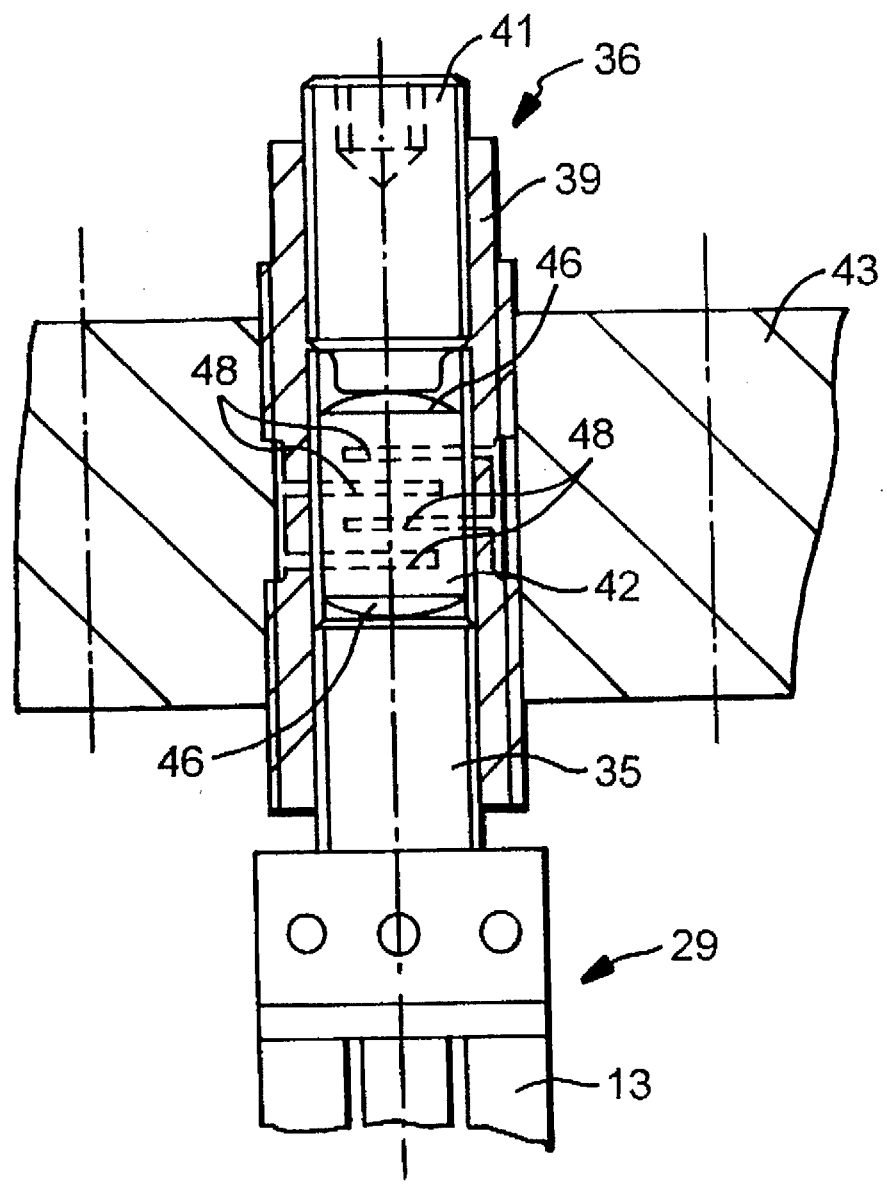

FIG. 4 shows an axial longitudinal section through another modified exemplary embodiment of a mechanical, i.e. manually actuatable adjusting device 36 of the preadjustment, or basic adjustment, of the die gap.

In this embodiment form, in the base plate or cross bar 43, a differential nut 39 is likewise once more screwed as a differential helical gear 37 into a corresponding bore with internal and external threads of different pitches. The threaded pin 35 of the group 29 of actuators 13 is screwed into the differential nut 39 from beneath; a screw or a threaded pin 41, preferably in the form of a grub screw, is screwed in the opposite direction, from above.

A pin or bolt 42, preferably with dome-shaped face ends 46, is inserted between the face ends of the threaded pins 35 and 41, which face ends are situated toward each other.

At this point, it is essential that the differential nut 39 has several slits 48, four of them in the exemplary embodiment shown, which are placed opposite from each other at fight angles to the longitudinal axis of the nut and whose radial depths extend beyond the middle point of the axis of the differential nut 39 and have a depth of more than 60%, for example, preferably more than 70%, particularly around 75% and more of the diameter or internal diameter of the differential screw 39.

By screwing in the grub screw 41, the slits 48 of the differential screw 39 now expand, and as a result its external threads are braced against the internal threads of the base plate or the cross bar 43. This is possible since the aforementioned pin or bolt 42 is inserted between the grub screw 41 and the threaded pin 35. By means of this construction, the grip without play can be produced without a slit having to be provided with a clamping screw, as in the exemplary embodiment according to FIGS. 1–3.

As can be gathered from the exemplary embodiment shown, particularly from FIGS. 2 and 3, a very narrow actuator spacing can be achieved by means of the design outlined. The width b of the individual actuators comes for example to around 8.5 mm. The thin space d between two actuators comes for example to around 1.5 mm. In other words, with a repeat rate or repeat interval a of 10 mm, one further actuator 13 each can be disposed. Particularly, the actuators are disposed in the direction of the outlet gap at a repeat interval with the center-to-center spacing of two adjacent actuators preferably less than 25 mm, the width of the actuators in the direction of the outlet gap being less than 20 mm. The spacing of the repeat interval of two successive actuators may be less than 16 mm and the width of the individual actuators less than 10 mm. The clearance spacing between two successive actuators may be less than 8 min.

To attain a narrow-band bending line of the die lip 3, this is analogous to the space between two adjacent actuators, i.e. having the same repeat rate as the longitudinal slits 33 between the actuators and is preferably slit congruently to it. To reduce the mechanical stress and to achieve a particularly flexible lip, these lip slits 47 come to an end in bores 49 having for example a diameter of from 4 to 8 mm, preferably around 6 min. The remaining residual wall thickness of for example from 1.5 to 6 mm, preferably around 2 to 4 mm, in particular 3 mm from the bottom of the bore to the edge where the melt emerges, that is the underside of the die lip 3, is likewise favorable for achieving a narrow-band bending line.

Finally in the exemplary embodiment shown, a cooling device 53 is also provided, which has a double conduit system 57a and 57b divided by baffles 55. By means of the upper conduit duct 57a cooling air for example is forcibly supplied, which can flow through the longitudinal slits 33 of the adjusting bolt and can circulate not only around the front, but also around the back and thus can cool. The cooling medium that cools the adjusting bolt 13 then flows, according to the arrows represented, by means of the lower duct 57b out again and is led away by the flat-sheet die. The cooling medium is forced through the gaps or longitudinal slits 33 by means of the aforementioned baffle device so that it can flow from top to bottom through the upper half of the bolt of the actuators 13, and from bottom to top in the lower half of the bolt. In the lateral direction, in the longitudinal direction of the die gap, the baffle device is covered on the end of each lip gap. Deviating from the exemplary embodiment, which has a supply and removal of the circulating cooling medium, the supply extending extends in the longitudinal direction of the individual adjusting elements, it is naturally also possible to employ a circulation in the direction lateral to the actuators, or a combination of both.

Finally, opposite from the baffle device for the cooling device, an insulation 61 is provided on the wall of the die body 7, which wall extends to the back end of the actuators 13.

The hoselike seal 11 is employed in the aforementioned recess 9 so that the cooling air cannot escape elsewhere. Furthermore, between the individual actuators, in the region of the anchoring heads 17, the platelike insulation, which is not shown in further detail in FIG. 3, is inserted in the longitudinal slits 33 formed between two adjacent actuators, which can extend for example as far as the side region of the retainer 19. Here, too, the circulating air cannot escape, but is removed again via the second duct 57b.

Preferably the cooling air is continuously and steadily circulated and on its own carries out the adjustment of the die lip by means of heating. In an absence of the heating process, a rapid cooling of the actuators is achieved by means of the constantly circulated cooling air; the play-free longitudinal expansion and contraction and the attendant pressure loading or tension relief of the upper die lip 3 is carded out by changing the temperature in the positive and negative direction, in each case relative to a zero temperature position.

Divergent from the exemplary embodiment shown, naturally only two, or more than three actuators or actuating bolts 13 can also be combined into a respective group or packet 29.

Figure 5:
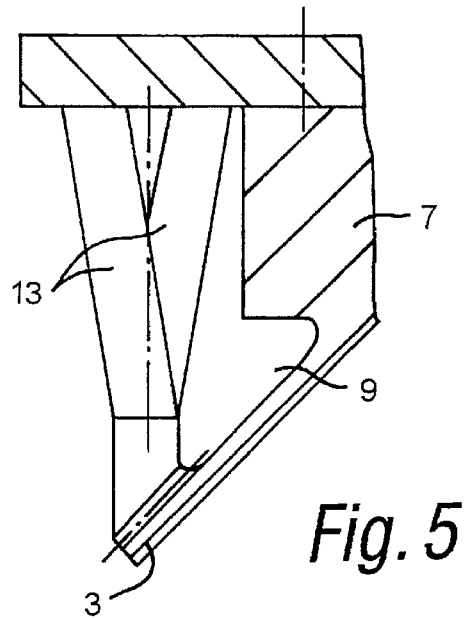

From FIG. 5, it is only schematically represented in cross section that instead of a rear coarse adjustment for a group of for example two adjusting members, a rear coarse adjustment for the aforementioned differential helical gearing 37, while still having sufficient space, is also possible if each two adjacent thermobolts, that is, adjusting members 13, are situated offset from one another disposed in a V when seen in cross section. As a result, it is possible to provide a separate basic adjustment for each individual actuator 13, for example in the form of a differential helical gearing 37; then because of the offset arrangement, twice as much space is available for each two adjacent actuators.

Figure 6:
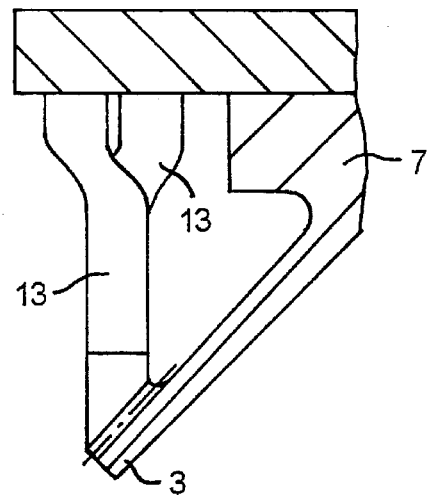

In the exemplary embodiment according to FIG. 6, the same result is achieved by employing actuators that extend offset from each other and have offset bends on their ends.

Figure 7:
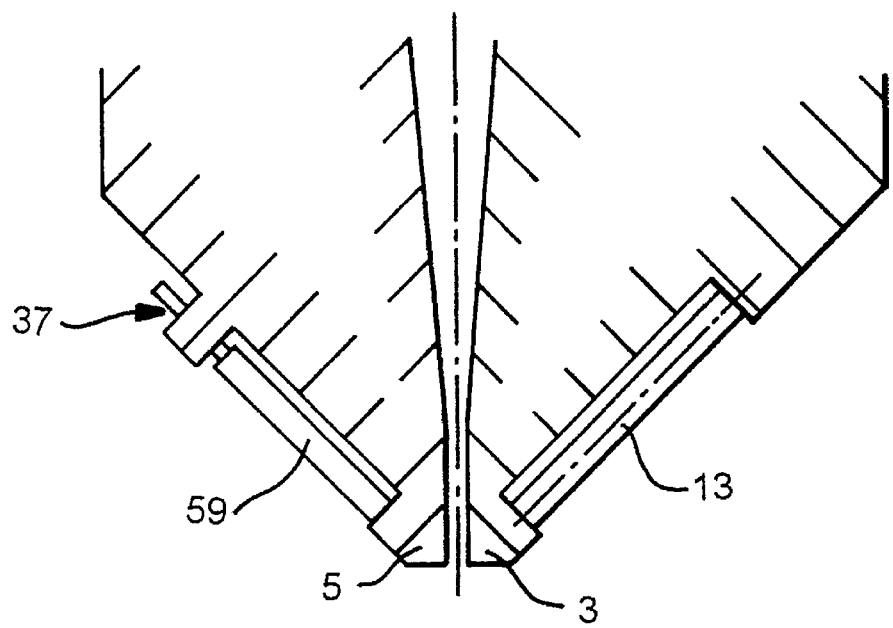

In a further modification according to FIG. 7, it is provided that the mechanical preadjustment 59, is provided and carded out for example on the lower die lip 5 and for example an automatic adjustment using the triggerable actuators 13, which are still to be explained, is provided and carried out on the respective other die lip 3, which is the upper one in the exemplary embodiment shown. In this case, with the actuators situated very close next to each other, the basic adjusting device, for example in the form of the aforementioned differential helical gearing 37, which requires installation space, is not needed. This basic adjustment can then be carded out on the respectively other sealing lip, for example by the use of a differential helical gearing 37.

Figure 8:
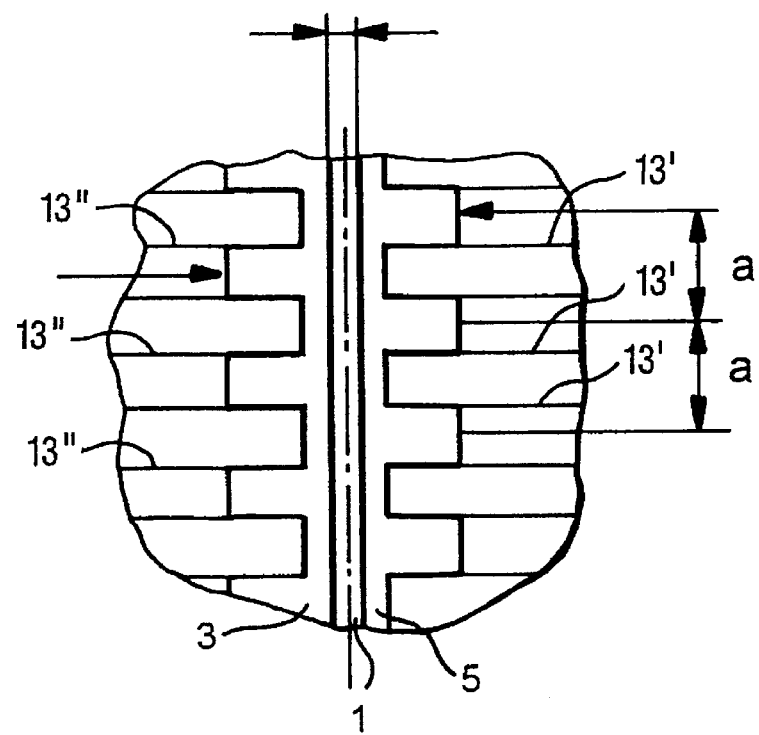

Finally, from the exemplary embodiment shown according to FIG. 8, is that both sealing lips 3 and 5 can be provided with an automatic adjustment by using triggerable actuators 13. In this exemplary embodiment, though, the actuators 13' of for example the one die lip 5 are disposed offset from the actuators 13" on the other die lip 5. In other words, on each sealing lip, sufficient spacing is available to accommodate the differential helical gearing 37, even though the same narrow regulating spacing is produced from the exemplary embodiment according to FIGS. 1–3 by doubly using the actuators on both sealing lips. Preferably, the actuators associated with one of the die lips are offset a half pitch in relation to the actuators associated with the other die lip.

Finally it may also be mentioned that deviating from the described heating cartridge, that is, from the thermoexpansion and contraction bolts described, actuators which can work piezomechanically or magnetostrictively can also be employed. Principles can be applied as well, which result in a volume change of the actuators, for example in an electrochemical way.

Figures 9, 10:
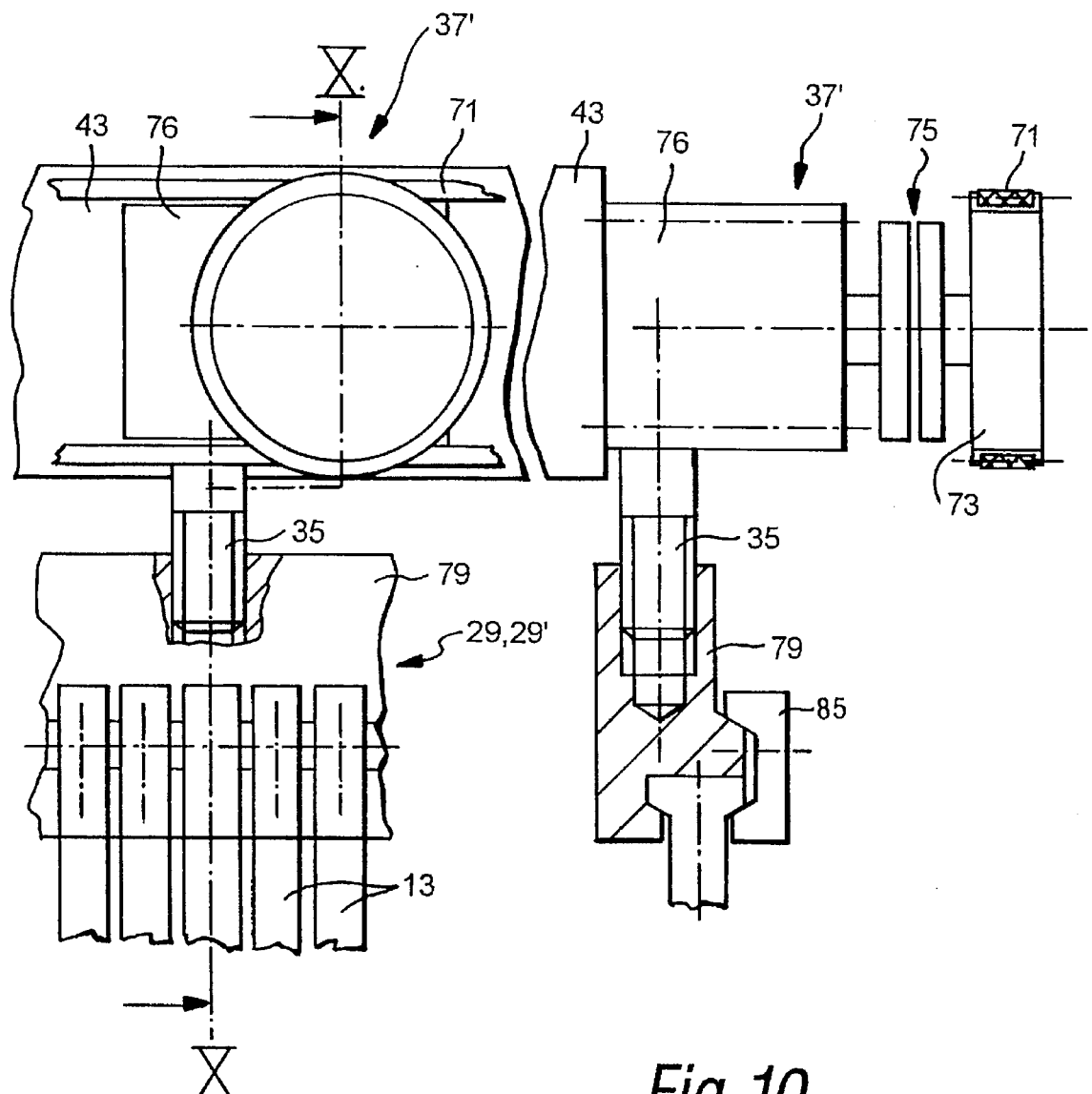

FIGS. 9 and 10 describe a further exemplary embodiment for a possible means, which can be driven by a motor and which is also indicated below as an automatic adjusting device, for mechanical and above all also constantly regulatable preadjustment and coarse adjustment of the die gap.

In this automatic adjusting device 37', which can also be actuated by a motor, for example an electric motor, which is not shown further in the drawing, is provided, which via a revolving toothed belt 71 or a comparable drive mechanism centrally drives several pinions 73 spaced apart from each other by for example 60 mm, 90 mm, 120 mm, etc., which rotate at a corresponding speed. Depending upon which group 29 of actuators 13 or which group section 29' should be adjusted with several preadjustable actuators 13, the flow of force is transmitted onto a bending bar 79 extending parallel to the base plate or cross bar 43 by engaging the clutch 75, which is situated axially offset from the axis of the pinion 73, via a gear disposed after it, preferably in the form of a worm gear 76. The worm gears 76 referred to are fastened to the cross bar 43 as mentioned. By a corresponding preadjustment of the bending bar 79, the die lip 3 can be preadjusted via the actuators 13 to achieve a preselectable profile or profile course. But a different preadjustment and basic adjustment of the die gap 3 can also be established constantly by motor during operation, in a controlled and purposeful fashion, via the motor drive.

In the exemplary embodiment shown, an axial adjusting of the bending bar 79 in the direction of the actuators 13 is carried out therefore via the worm gear 76 by axially adjusting the threaded pin 35 (screwing it in and out).

From FIG. 10, it is also seen that the actuators 13 are fastened on their ends pointing toward the bending bar 79 by means of a fastening mechanism, which in its basic design corresponds to the chucking device of the end of the actuators 13 of FIG. 1 oriented toward the die lips. In other words, the ends 83 oriented toward the bending bar are embodied as dovetail-shaped, are inserted by one dovetail-shaped side into a corresponding recess in the bending bar 79, and are secured toward the opposite side by a suitably U-shaped clamp or retainer 85 corresponding to the retainer 19.

In the motor-actuatable adjusting device 37' of FIGS. 9 and 10, the individual clutches 75 can be actuated one at a time in succession or else a plurality of clutches may be actuated at the same time, i.e. simultaneously, and as a result the bending bars can be adjusted and set simultaneously at several points. If one or more threaded pins 35 are to be rotated in opposite directions, then the applicable clutches must be engaged in succession, after the direction of rotation of the drive transmission device, which in the exemplary embodiment is the toothed belt 71, has first been changed (as a rule by reversing the direction of rotation of the motor that drives the toothed belt).

We claim:

1. A wide slot die of an extrusion system for producing flat sheets comprising:

upper and lower die parts having upper and lower die lips delimiting a longitudinally extending outlet gap;

length-adjustable actuators;

means for positively adjusting the length of each said actuator, at least one of the two die lips being flexibly adjusted to vary a width of the gap by said length-adjustable actuators; and a plurality of preadjusting devices for adjusting the position of said adjustable actuators to vary the width of the gap, said actuators being arranged in the longitudinal direction of the longitudinally extending outlet gap and athwart the direction of extrudate flow, each said preadjusting device being common to a group of at least two actuators to commonly preadjust said group of actuators.

2. The wide slot die according to claim 1 wherein the preadjusting devices are disposed in the longitudinal direction of said outlet gap with a pitch larger than the pitch of said actuators.

3. The wide slot die according to claim 1 wherein said group including at least two actuators is provided substantially in one integral piece, at least one longitudinal slit along said piece to form discrete actuators and on a side thereof remote from said die lip, a base for connecting the discrete actuators.

4. The wide slot die according to claim 1 wherein the actuators are disposed in the direction of said outlet gap at a repeat interval with a center-to-center spacing of two adjacent actuators of less than 25 mm, the width of the actuators in the direction of the outlet gap being less than 20 min.

5. The wide slot die according to claim 4 wherein the spacing of the repeat interval of two successive actuators is less than 16 mm.

6. The wide slot die according to claim 4 wherein the width of the individual actuators is less than 10 mm.

7. The wide slot die according to claim 4 wherein the clearance spacing between two successive actuators is less than 8 mm.

8. The wide slot die according to claim 1 including a cooling system comprising supply and return ducts for flowing a gaseous cooling medium in a longitudinal region along said actuators and baffles defining said supply and return conduits and extending substantially along the front side of the actuators.

9. The wide slot die according to claim 8 including a die body for mounting at least said upper lip, and on the rearward side of said actuators and an adjoining wall of the die body, an insulation covering the die body.

10. The wide slot die according to claim 1 wherein said actuators are disposed in a die body, insulation provided along a rear side of said actuators on an adjacent wall of said die body, said insulation covering the die body.

11. The wide slot die according to claim 1 including a die body for mounting at least said upper lip and having a recess forming a weakened portion of said die body enabling adjustment of said upper die lip, and a seal inserted into said recess.

12. The wide slot die according to claim 1 wherein said group of at least two actuators are connected to a base and said preadjusting devices each includes a differential nut having internal and external threads different from one another, said external thread being screwed into a base plate, said differential nut having a plurality of radially extending slits axially offset from one another in different radial directions, an adjustment pin connected to said base and screwed into said internal thread at one end of said differential nut, a locking pin screwed into said internal thread at the other end of said differential nut, and a bridging pin inserted in said differential nut at a location corresponding to the axial location of said slits between facing ends of said locking and adjustment pins.

13. A wide slot die of an extrusion system for producing flat sheets comprising:

upper and lower die parts having upper and lower die lips delimiting a longitudinally extending outlet gap;

length-adjustable actuators;

means for positively adjusting the length of each said actuator, at least one of the two die lips being flexibly adjusted to vary a width of the gap by said length-adjustable actuators;

a plurality of preadjusting devices for adjusting the position of said adjustable actuators to vary the width of the gap; and pairs of said actuators being adjacent and following each other in sequence in the longitudinal direction of the outlet gap and lying athwart the direction of extrudate flow having at ends thereof remote from said one adjustable die lip a transverse offset, said preadjusting devices of said two adjacent actuators being arranged with a corresponding transverse offset.

14. The wide slot die according to claim 13 wherein said two adjacent actuators are disposed to diverge in approximately a V-configuration from the adjustable die lips to their rearward end.

15. A wide slot die of an extrusion system for producing flat sheets comprising upper and lower die parts having upper and lower die lips delimiting a longitudinally extending outlet gap, the two die lips being flexibly adjustable to vary the width of the gap, length-adjustable actuators, means for positively adjusting the length of each said actuator to flexibly adjust the two die lips to vary the width of the gap, a plurality of preadjusting devices for adjusting the position of said length-adjustable actuators to vary the width of the gap, said length-adjustable actuators being provided for each die lip, the length-adjustable actuators provided for one die lip being offset in relation to the length-adjustable actuators provided for the other die lip, at least one of the actuators acting on one of the two die lips having one of said preadjusting devices for adjusting the actuators relative to said one of said two die lips.

16. A wide slot die according to claim 15 wherein the actuators associated with one of said die lips are offset a half pitch in relation to the actuators associated with the other die lip.

* * * * *